(12) United States Patent
Funk et al.

(10) Patent No.: US 7,910,675 B2
(45) Date of Patent: Mar. 22, 2011

(54) METHOD FOR PRODUCING WATER-ABSORBING POLYMER PARTICLES

(75) Inventors: Rüdiger Funk, Niedernhausen (DE); Jürgen Schröder, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 455 days.

(21) Appl. No.: 11/997,941

(22) PCT Filed: Aug. 10, 2006

(86) PCT No.: PCT/EP2006/065206
§ 371 (c)(1),
(2), (4) Date: Feb. 5, 2008

(87) PCT Pub. No.: WO2007/023097
PCT Pub. Date: Mar. 1, 2007

(65) Prior Publication Data
US 2008/0227932 A1    Sep. 18, 2008

Related U.S. Application Data

(60) Provisional application No. 60/710,925, filed on Aug. 24, 2005.

(51) Int. Cl.
*C08F 20/06* (2006.01)
(52) U.S. Cl. .......... 526/317.1; 526/65; 526/930
(58) Field of Classification Search ............ 526/65, 526/317.1, 930
See application file for complete search history.

(56) References Cited

U.S. PATENT DOCUMENTS

| | | | |
|---|---|---|---|
| 3,719,643 A | 3/1973 | Knight | |
| 5,480,616 A | 1/1996 | Richardson et al. | |
| 6,602,950 B1 * | 8/2003 | Dentler et al. | 524/832 |
| 7,084,234 B2 | 8/2006 | Wilhelm et al. | |
| 7,193,006 B2 * | 3/2007 | Ishizaki et al. | 524/500 |
| 7,250,481 B2 * | 7/2007 | Jaworek et al. | 526/321 |
| 7,259,212 B2 * | 8/2007 | Popp et al. | 525/329.7 |
| 7,307,132 B2 * | 12/2007 | Nestler et al. | 526/317.1 |
| 2006/0235170 A1 | 10/2006 | Iwasaki et al. | |

FOREIGN PATENT DOCUMENTS

| | | |
|---|---|---|
| EP | 0 574 007 | 12/1993 |
| EP | 1 426 402 | 6/2004 |
| GB | 967261 | 8/1964 |
| GB | 1443394 | 7/1976 |
| WO | WO-03/093345 | 11/2003 |
| WO | WO-2005/010055 | 2/2005 |

OTHER PUBLICATIONS

Buchholz et al., "Modern Superabsorbent Polymer Technology," Wiley-VCH, pp. 69-117 (1998).
International Search Report in PCT/EP2006/065206 dated Oct. 30, 2006.

* cited by examiner

*Primary Examiner* — David Wu
*Assistant Examiner* — Vu A Nguyen
(74) *Attorney, Agent, or Firm* — Marshall, Gerstein & Borun LLP

(57) ABSTRACT

A process for producing water-absorbing polymeric particles comprises conducting the polymerization in at least two parallel continuous polymerization reactors under substantially identical conditions and further processing the reaction products conjointly in at least one process step.

17 Claims, No Drawings

METHOD FOR PRODUCING WATER-ABSORBING POLYMER PARTICLES

CROSS-REFERENCE TO RELATED APPLICATIONS

This is the U.S. national phase application of International Application No. PCT/EP2006/065206, filed Aug. 10, 2006, which claims the benefit of U.S. provisional patent application No. 60/710,925, filed Aug. 24, 2005.

The present invention relates to a process for producing water-absorbing polymeric particles by polymerization in at least two parallel continuous polymerization reactors wherein the reaction products are conjointly further processed in at least one process step.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products swellable in aqueous fluids, such as guar derivatives for example. Such polymers are used as products capable of absorbing aqueous solutions to produce diapers, tampons, sanitary napkins and other hygiene articles, but also as water-retaining agents in market gardening.

Water-absorbing resins typically have a Centrifuge Retention Capacity in the range 15 to 60 g/g, preferably of at least 20 g/g, more preferably of at least 25 g/g, even more preferably of at least 30 g/g and most preferably of at least 35 g/g. Centrifuge Retention Capacity (CRC) is determined by EDANA (European Disposables and Nonwovens Association) recommended test method No. 441.2-02 "Centrifuge retention capacity".

To improve their performance characteristics, for example Saline Flow Conductivity (SFC) in the diaper and Absorbency Under Load (AUL), water-absorbing polymeric particles are generally postcrosslinked. This postcrosslinking can be carried out in the aqueous gel phase. Preferably, however, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the hydrophilic polymer or capable of crosslinking together at least two carboxyl groups or other functional groups of at least two different polymeric chains of the base polymer.

The production of water-absorbing resins has been extensively described, see for example "Modern Superabsorbent Polymer Technology", F. L. Buchholz and A. T. Graham, Wiley-VCH, 1998, pages 69 to 117.

The production of water-absorbing resins typically comprises the steps of polymerization, gel comminution, drying, grinding, screening, postcrosslinking and, if appropriate, renewed screening.

One problem with the continuous production of water-absorbing polymeric particles is that the properties of the product polymeric particles, such as Centrifuge Retention Capacity (CRC), Absorbency Under Load (AUL), Saline Flow Conductivity (SFC), residual monomer content, particle size distribution, extractables and water content are difficult to keep constant over time during the manufacturing operation.

EP-A 1 426 402 discloses a process for continuous production of water-absorbing polymers wherein deviations in product quality are made good by analyzing the product after postcrosslinking and completely removing product having an excessively large quality deviation and recycling it into product still to be analyzed.

The present invention has for its object to provide an improved process for continuous production of water-absorbing polymeric particles possessing consistent quality.

A further problem with the production of water-absorbing polymeric particles is the fact that off-spec product, generated in the event of disruptions to the polymerization, cannot be converted into on-spec product and has to be discarded.

The present invention accordingly further has for its object to provide a process for continuous production of water-absorbing polymeric particles which is capable of making good in particular small metering inaccuracies in the course of the polymerization.

Metering inaccuracies arise in the course of the continuous polymerization process for example. The materials used are typically metered under closed loop quantitative control where the controllers used only conform the valve opening in the event of a target value deviation.

A polymerization is a very sensitive reaction. Deviations at metering, in particular with regard to initiator metering, can therefore lead to significant deviations in product quality.

We have found that this object is achieved by a process for producing water-absorbing polymeric particles, which comprises conducting the polymerization in at least two parallel continuous polymerization reactors under substantially identical conditions and further processing the reaction products conjointly in at least one process step.

As a result of producing water-absorbing polymeric particles of the same recipe in parallel polymerization reactors, possible disruptions during polymerization are only propagated in attenuated form. The reason why this is important is, in particular, that the polymerization is an extremely sensitive process step.

Substantially identical conditions is to be understood as meaning that identical monomer solutions within the margin of metering accuracy are polymerized in the parallel polymerization reactors with the goal of obtaining identical hydrogels.

The at least one process step in which the polymers from the parallel polymerization reactors are conjointly further processed serves to effect homogenization. Therefore, the polymers should be thoroughly commixed. After the polymers from the parallel polymerization reactors have been thoroughly commixed, the polymers may also be further processed separately.

Kneading reactors or belt reactors are suitable reactors. In a kneader, the polymer gel produced in the course of the polymerization of an aqueous monomer solution is for example continuously comminuted by contrarotatory stirring shafts, as described in WO 01/38402. The polymerization on a belt is described for example in DE-A 38 25 366 and U.S. Pat. No. 6,241,928. The polymerization in a belt reactor produces a polymer gel which has to be comminuted in a further process step, for example by comminution in a meat grinder, extruder or kneader.

The process of the present invention preferably utilizes belt reactors and/or kneaders. A preferred embodiment utilizes exclusively belt reactors or kneaders.

The process of the present invention may utilize two, three, four, five or more parallel polymerization reactors.

The at least one process step in which the water-absorbing polymeric particles are conjointly further processed is not subject to any restriction. But it is important that the reaction products are only further processed conjointly once the polymerization is essentially complete. The polymerization is essentially complete once the polymeric gel leaves the reactors. Monomer conversion is typically at least 90 mol %, preferably at least 95 mol % and more preferably at least 97 mol %. Because the polymerization is substantially complete, random deviations or disruptions in later process steps have only little effect on the internal structure of the polymeric particles. For example, the process step in which the polymers are conjointly further processed can be the storage of the hydrogel, the drying of the hydrogel, the grinding of the dried hydrogel, the screening of the ground polymeric particles, the postcrosslinking or the screening of the postcrosslinked polymeric particles.

The at least one process step in which the water-absorbing polymeric particles are conjointly further processed is typically the postcrosslinking, preferably the screening of the ground polymeric particles, more preferably the grinding of the dried hydrogel, even more preferably the drying of the hydrogel and most preferably the storage of the hydrogel after polymerization.

Advantageously, the reaction products of the at least two continuous polymerization reactors are conjointly further processed at a very early stage of the process after the polymerization.

The process of the present invention is particularly advantageous when the monomers used are stabilized with very little by way of polymerization inhibitor; that is, when, based on the monomer, less than 0.016% by weight, preferably from 0.001% to 0.013% by weight and more preferably from 0.003% to 0.007% by weight of polymerization inhibitor is used. Polymerization inhibitors are used for safety reasons to prevent polymerization upstream of the reactor. A lower fraction of polymerization inhibitor makes the reaction faster and it is more difficult to control.

The hydrogel is preferably dried by means of a belt dryer.

The water-absorbing polymeric particles producible in the process of the present invention can be produced by addition polymerization of a monomer solution comprising i) at least one ethylenically unsaturated acid-functional monomer, ii) at least one crosslinker, iii) if appropriate one or more ethylenically and/or allylically unsaturated monomers copolymerizable with i), and iv) if appropriate one or more water-soluble polymers onto which the monomers i), ii) and if appropriate iii) can be at least partly grafted, the base polymer obtained being dried, classified, v) if appropriate aftertreated with at least one postcrosslinker, dried and thermally postcrosslinked.

Suitable monomers i) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. Acrylic acid is most preferable.

The monomers i) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

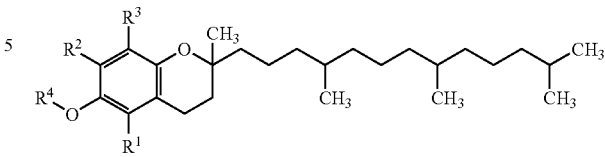

where $R^1$ is hydrogen or methyl, $R^2$ is hydrogen or methyl, $R^3$ is hydrogen or methyl and $R^4$ is hydrogen or an acid radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3$=methyl, especially racemic alpha-tocopherol. $R^4$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The water-absorbing polymers are in a crosslinked state, i.e., the addition polymerization is carried out in the presence of compounds having two or more polymerizable groups which can be free-radically interpolymerized into the polymer network. Useful crosslinkers ii) include for example ethylene glycol dimethacrylate, diethylene glycol diacrylate, allyl methacrylate, trimethylolpropane triacrylate, triallylamine, tetraallyloxyethane as described in EP-A-0 530 438, di- and triacrylates as described in EP-A-0 547 847, EP-A-0 559 476, EP-A-0 632 068, WO 93/21237, WO 03/104299, WO 03/104300, WO 03/104301 and in German patent application 103 31 450.4, mixed acrylates which, as well as acrylate groups, comprise further ethylenically unsaturated groups, as described in German patent applications 103 31 456.3 and 103 55 401.7, or crosslinker mixtures as described for example in DE-A 195 43 368, DE-A 196 46 484, WO 90/15830 and WO 02/32962.

Useful crosslinkers ii) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers ii) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth) acrylates of polyethylene glycols, the polyethylene glycol used having a molecular weight between 300 and 1000.

However, particularly advantageous crosslinkers ii) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred for use as crosslinkers ii) are diacrylated, dimethacrylated, triacrylated or trimethacrylated multiply ethoxylated and/or propoxylated glycerols as described for example in prior German patent application DE 103 19 462.2. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension compared with water at the same temperature (typically not less than 0.068 N/m).

The amount of crosslinker ii) is preferably in the range from 0.01% to 1% by weight, more preferably in the range from 0.05% to 0.5% by weight and even more preferably in the range from 0.1% to 0.3% by weight, all based on the monomer i).

Examples of ethylenically unsaturated monomers iii) which are copolymerizable with the monomers i) are acrylamide, methacrylamide, crotonamide, dimethylaminoethyl methacrylate, dimethylaminoethyl acrylate, dimethylaminopropyl acrylate, diethylamino-propyl acrylate, dimethylaminobutyl acrylate, dimethylaminoethyl methacrylate, diethylaminoethyl methacrylate, dimethylaminoneopentyl acrylate and dimethylamino-neopentyl methacrylate.

Useful water-soluble polymers iv) include polyvinyl alcohol, polyvinylpyrrolidone, starch, starch derivatives, polyglycols or polyacrylic acids, preferably polyvinyl alcohol and starch.

The preparation of a suitable base polymer and also further useful hydrophilic ethylenically unsaturated monomers i) are described in DE-A-199 41 423, EP-A-0 686 650, WO 01/45758 and WO 03/104300.

The reaction is preferably carried out in a kneader as described for example in WO 01/38402, or on a belt reactor as described for example in EP-A 955 086.

Advantageously, the hydrogel is after leaving the polymerization reactor stored at a comparatively high temperature, preferably at least 50° C., more preferably at least 70° C. and most preferably at least 80° C. and also preferably less than 100° C., for example in insulated containers. Storage, typically for 2 to 12 hours, further increases monomer conversion.

The acid groups of the hydrogels obtained are typically in a partially neutralized state, the extent of neutralization preferably being in the range from 25 to 95 mol %, more preferably in the range from 27 to 80 mol % and even more preferably in the range from 27 to 30 mol % or from 40 to 75 mol %, for which the customary neutralizing agents can be used, for example alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof. Typically, neutralization is achieved by admixing the neutralizing agent as an aqueous solution, as a melt or else preferably as a solid material. For example, sodium hydroxide having a water fraction of distinctly below 50% by weight can be present as a waxy mass having a melting point above 23° C. In this case, metering as piece goods or melt at elevated temperature is possible.

Neutralization can be carried out after polymerization, at the hydrogel stage. But it is also possible to neutralize up to 40 mol %, preferably from 10 to 30 mol % and more preferably from 15 to 25 mol % of the acid groups before polymerization by adding a portion of the neutralizing agent to the monomer solution and setting the desired final degree of neutralization only after polymerization, at the hydrogel stage. The monomer solution may be neutralized by admixing the neutralizing agent. The hydrogel can be mechanically comminuted, for example by means of a meat grinder, in which case the neutralizing agent can be sprayed, sprinkled or poured on and then carefully mixed in. To this end, the gel mass obtained can be repeatedly minced for homogenization. Neutralization of the monomer solution directly to the final degree of neutralization is preferred.

The neutralized hydrogel is then dried with a belt or drum dryer until the residual moisture content is preferably below 15% by weight and especially below 10% by weight, the water content being determined by EDANA (European Disposables and Nonwovens Association) recommended test method No. 430.2-02 "Moisture content". Selectively, drying can also be carried out using a fluidized bed dryer or a heated plowshare mixer. To obtain particularly white products, it is advantageous to dry this gel by ensuring rapid removal of the evaporating water. To this end, the dryer temperature must be optimized, the air feed and removal has to be policed, and at all times sufficient venting must be ensured. Drying is naturally all the more simple—and the product all the more white—when the solids content of the gel is as high as possible. The solids content of the gel prior to drying is therefore preferably between 30% and 80% by weight. It is particularly advantageous to vent the dryer with nitrogen or some other non-oxidizing inert gas. Selectively, however, simply just the partial pressure of the oxygen can be lowered during drying to prevent oxidative yellowing processes. But in general adequate venting and removal of the water vapor will likewise still lead to an acceptable product. A very short drying time is generally advantageous with regard to color and product quality.

A further important function of drying the gel is to continue to reduce the residual monomer content of the superabsorbent. This is because any residual initiator will decompose during drying, leading to any residual monomers becoming interpolymerized. In addition, the evaporating amounts of water will entrain any free water-vapor-volatile monomers still present, such as acrylic acid for example, and thus likewise lower the residual monomer content of the superabsorbent.

The dried hydrogel is then ground and classified, useful grinding apparatus typically including single or multiple stage roll mills, preferably two or three stage roll mills, pin mills, hammer mills or swing mills.

To improve their performance characteristics, such as Saline Flow Conductivity (SFC) in the diaper and Absorbency Under Load (AUL), water-absorbing polymeric particles are generally postcrosslinked. This postcrosslinking can be carried out in the aqueous gel phase. Preferably, however, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the hydrophilic polymer or capable of crosslinking together at least two carboxyl groups or other functional groups of at least two different polymeric chains of the base polymer.

Useful postcrosslinkers v) are compounds comprising two or more groups capable of forming covalent bonds with the carboxylate groups of the polymers. Useful compounds are for example alkoxysilyl compounds, polyaziridines, polyamines, polyamidoamines, di- or polyglycidyl compounds as described in EP-A-0 083 022, EP-A 543 303 and EP-A 937 736, polyhydric alcohols as described in DE-C 33 14 019, DE-C 35 23 617 and EP-A 450 922, or β-hydroxyalkylamides as described in DE-A 102 04 938 and U.S. Pat. No. 6,239,230. It is also possible to use compounds of mixed functionality, such as glycidol, 3-ethyl-3-oxetanemethanol (trimethylolpropaneoxetane), as described in EP-A 1 199 327, aminoethanol, diethanolamine, triethanolamine or compounds which develop a further functionality after the first reaction, such as ethylene oxide, propylene oxide, isobutylene oxide, aziridine, azetidine or oxetane.

Useful postcrosslinkers v) are further said to include by DE-A 40 20 780 cyclic carbonates, by DE-A 198 07 502 2-oxazolidone and its derivatives, such as N-(2-hydroxyethyl)-2-oxazolidone, by DE-A 198 07 992 bis- and poly-2-oxazolidones, by DE-A 198 54 573 2-oxotetrahydro-1,3-oxazine and its derivatives, by DE-A 198 54 574 N-acyl-2-oxazolidones, by DE-A 102 04 937 cyclic ureas, by German patent application 103 34 584.1 bicyclic amide acetals, by EP-A 1 199 327 oxetanes and cyclic ureas and by WO 03/031482 morpholine-2,3-dione and its derivatives.

Postcrosslinking is typically carried out by spraying a solution of the postcrosslinker onto the hydrogel or the dry basepolymeric particles. Spraying is followed by thermal drying, and the postcrosslinking reaction can take place not only before but also during drying.

The spraying with a solution of crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex® mixers, Nauta® mixers, Processall® mixers and Schugi® mixers.

Contact dryers are preferable, shovel dryers more preferable and disk dryers most preferable as apparatus in which thermal drying is carried out. Suitable dryers include for example Bepex® dryers and Nara® dryers. Fluidized bed dryers can be used as well.

Drying can take place in the mixer itself, for example by heating the shell or blowing warm air into it. It is similarly possible to use a downstream dryer, for example a tray dryer, a rotary tube oven or a heatable screw. But it is also possible for example to utilize an azeotropic distillation as a drying process.

Preferred drying temperatures range from 50 to 250° C., preferably from 50 to 200° C., and more preferably from 50 to 150° C. The preferred residence time at this temperature in the reaction mixer or dryer is below 30 minutes and more preferably below 10 minutes.

The process of the present invention provides water-absorbing polymeric particles of constant quality. The water-absorbing polymeric particles produced differ only minimally in their properties. If, for example, samples are taken at regular intervals, every 3 hours for example, during the continuous manufacture of water-absorbing polymeric particles, the standard deviation of the measurements from the mean is smaller when the process of the present invention is used than in the case of existing processes.

Moreover, disruptions in the course of the polymerization in the process of the present invention have less of an effect on the quality of the water-absorbing polymeric particles.

EXAMPLES

Deviations in product quality were simulated by means of a die in the examples. The mean value is 3.5 (given the same probability for all numbers and infinitely many throws).

Example 1

Comparative

Two independent continuous production lines were simulated by analyzing the end product at time intervals.

| Line A | | | | | | | | | | | | | | | | | | | | |
|---|---|---|---|---|---|---|---|---|---|---|---|---|---|---|---|---|---|---|---|---|
| Sample | 1 | 2 | 3 | 4 | 5 | 6 | 7 | 8 | 9 | 10 | 11 | 12 | 13 | 14 | 15 | 16 | 17 | 18 | 19 | 20 |
| Number | 4 | 3 | 4 | 1 | 2 | 3 | 2 | 2 | 2 | 1 | 5 | 4 | 6 | 2 | 6 | 5 | 2 | 5 | 1 | 1 |

| Line B | | | | | | | | | | | | | | | | | | | | |
|---|---|---|---|---|---|---|---|---|---|---|---|---|---|---|---|---|---|---|---|---|
| Sample | 1 | 2 | 3 | 4 | 5 | 6 | 7 | 8 | 9 | 10 | 11 | 12 | 13 | 14 | 15 | 16 | 17 | 18 | 19 | 20 |
| Number | 6 | 3 | 3 | 2 | 3 | 1 | 1 | 4 | 2 | 6 | 6 | 2 | 2 | 5 | 6 | 3 | 5 | 6 | 5 | 1 |

25% of the numbers thrown (3+4) were close to the mean and 35% of the numbers thrown (1+6) were remote from the mean.

Example 2

Combining the products of the two separate polymerization lines in the workup was simulated. The respective means of the numbers determined above were used for the samples.

| Sample | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Value | 5 | 3 | 3.5 | 1.5 | 2.5 | 2 | 1.5 | 3 | 2 | 3.5 | 5.5 | 3 | 4 | 3.5 | 6 | 4 | 3.5 | 5.5 | 3 | 1 |

50% of the values (3-4) were close to the mean and only 10% of the values (1+6) were remote from the mean.

The example shows that the process of the invention provides a distinctly more uniform continuous production.

We claim:

1. A process for producing water-absorbing polymeric particles, which comprises conducting a polymerization in at least two parallel continuous polymerization reactors under substantially identical conditions and further processing reaction products conjointly in at least one process step.

2. The process according to claim 1 wherein at least one of the parallel polymerization reactors is a belt reactor and/or a kneader.

3. The process according to claim 1 wherein the parallel polymerization reactors are exclusively belt reactors or kneaders.

4. The process according to claim 1 wherein the reaction products of the parallel polymerization reactors are conjointly subjected to a postcrosslinking step.

5. The process according to claim 1 wherein the reaction products of the parallel polymerization reactors are conjointly screened.

6. The process according to claim 1 wherein the reaction products of the parallel polymerization reactors are conjointly ground.

7. The process according to claim 1 wherein the reaction products of the parallel polymerization reactors are conjointly dried.

8. The process according to claim 7 wherein the dryer is a belt dryer.

9. The process according to claim 1 wherein the reaction products of the parallel polymerization reactors are conjointly stored before drying.

10. The process according to claim 1 wherein a monomer solution polymerized in the parallel polymerization reactors comprises acrylic acid and at least one crosslinker copolymerizable with acrylic acid.

11. The process according to claim 1 wherein the polymerization is carried out in the presence of less than 0.016% by weight, based on monomers, of a polymerization inhibitor.

12. The process according to claim 4 wherein the reaction products of the parallel polymerization reactors are conjointly screened.

13. The process according to claim 4 wherein the reaction products of the parallel polymerization reactors are conjointly ground.

14. The process according to claim 4 wherein the reaction products of the parallel polymerization reactors are conjointly dried.

15. The process according to claim 5 wherein the reaction products of the parallel copolymerization reactors are conjointly ground.

16. The process according to claim 5 wherein the reaction products of the parallel copolymerization reactors are conjointly dried.

17. The process according to claim 1 wherein the reaction products of the parallel polymerized reactors are processed conjointly in at least two of a surface crosslinking step, screening, grinding, drying, and storing.

* * * * *